United States Patent
Hong et al.

(10) Patent No.: US 11,337,156 B2
(45) Date of Patent: May 17, 2022

(54) WIRELESS BATTERY MANAGEMENT SYSTEM, NODE FOR WIRELESS COMMUNICATION, AND METHOD OF TRANSMITTING DATA

(71) Applicant: SILICON WORKS CO., LTD., Daejeon (KR)

(72) Inventors: Ju Pyo Hong, Daejeon (KR); Ki Suk Cho, Daejeon (KR); Heung Lyeol Lee, Daejeon (KR); Kyu Ho Kim, Daejeon (KR); Seung Jun Choi, Daejeon (KR); Deog Soo Kim, Daejeon (KR); Yong Ju Seon, Daejeon (KR); Hee Jin Lee, Daejeon (KR); Young Ho Seo, Daejeon (KR); Jong Chan Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 16/899,167

(22) Filed: Jun. 11, 2020

(65) Prior Publication Data

US 2020/0396688 A1 Dec. 17, 2020

(30) Foreign Application Priority Data

Jun. 17, 2019 (KR) .......................... 10-2019-0071727
May 12, 2020 (KR) .......................... 10-2020-0056264

(51) Int. Cl.
*H04W 84/18* (2009.01)
*H04W 52/02* (2009.01)
(Continued)

(52) U.S. Cl.
CPC ...... *H04W 52/0261* (2013.01); *H04B 17/318* (2015.01); *H04W 24/08* (2013.01); *H04W 72/04* (2013.01)

(58) Field of Classification Search
CPC . H04W 52/0261; H04W 24/08; H04W 72/04; H04W 8/24; H04W 88/04;
(Continued)

(56) References Cited

U.S. PATENT DOCUMENTS

2015/0238082 A1 8/2015 Soro et al.
2017/0070919 A1* 3/2017 Verger ................ H04L 65/1083
(Continued)

FOREIGN PATENT DOCUMENTS

KR 10-2015-0054335 A 5/2015

*Primary Examiner* — Said M Elnoubi
(74) *Attorney, Agent, or Firm* — Harness, Dickey & Pierce, P.L.C.

(57) ABSTRACT

The present disclosure relates to a wireless battery management system which ensures stability when obtaining battery data through wireless communication. The battery management system includes a manager node operating a primary channel and a secondary channel based on wireless communication and obtaining battery data from a monitor node by using the primary channel or the secondary channel and a monitor node connected to a battery module to collect battery data including one or more of a current, a voltage, a temperature, and self-diagnosis data of the battery module, transmit the collected battery data to the manager node through the primary channel, and when the transmission of the battery data through the primary channel fails, transmit the battery data to the manager node through the secondary channel.

4 Claims, 10 Drawing Sheets

(51) Int. Cl.
  *H04W 24/08* (2009.01)
  *H04W 72/04* (2009.01)
  *H04B 17/318* (2015.01)
(58) Field of Classification Search
  CPC ..... H04W 84/18; H04W 24/04; H04W 24/10; H04W 4/80; H04W 4/06; H04W 74/0816; H04B 17/318; Y02E 60/10; Y02D 30/70; G08C 17/02; H01M 10/4207; H01M 10/425; H01M 2010/4271; H01M 2010/4278; H04L 1/20
  See application file for complete search history.

(56) References Cited

U.S. PATENT DOCUMENTS

| | | | |
|---|---|---|---|
| 2018/0027429 A1* | 1/2018 | Li | H04W 24/02 |
| | | | 455/426.1 |
| 2019/0334760 A1* | 10/2019 | Das | H04W 24/02 |
| 2021/0028631 A1* | 1/2021 | Hwang | H02J 50/20 |

* cited by examiner

WIRELESS BATTERY MANAGEMENT SYSTEM, NODE FOR WIRELESS COMMUNICATION, AND METHOD OF TRANSMITTING DATA

CROSS-REFERENCE TO RELATED APPLICATIONS

This application claims the benefit of the Korean Patent Application No. 10-2019-0071727 filed on Jun. 17, 2019 and No. 10-2020-0056264 filed on May 12, 2020, which is hereby incorporated by reference as if fully set forth herein.

FIELD

The present disclosure relates to a wireless battery management system, and more particularly, to a wireless battery management system, a node for wireless communication, and a method of transmitting data, which ensure stability when obtaining battery data through wireless communication.

BACKGROUND

As the demand for portable electronic products such as notebook computers, video cameras, and portable phones increases rapidly and electric vehicles, storage batteries for storing energy, robots, and satellites are really developed, research on high-performance batteries capable of being repeatedly charged and discharged is being actively done.

A minimum unit of each battery may be referred to as a battery cell, and a plurality of battery cells serially connected to one another may configure a battery module. Also, a plurality of battery modules may be connected to one another in series or parallel, and thus, may configure a battery pack.

Generally, a battery pack equipped in electric vehicles and the like includes a plurality of battery modules connected to one another in series or parallel. The battery pack includes a battery management system which monitors a state of each of the battery modules and executes a control operation corresponding to the monitored state.

The battery management system includes a controller for obtaining and analyzing battery data. However, each of the battery modules included in the battery pack includes a plurality of battery cells, and due to this, there is a limitation in monitoring states of all of the battery cells included in the battery pack by using a single controller. Therefore, a method, where a controller is equipped in each of a certain number of battery modules included in a battery pack, one of the controllers is set as a master, and the other controllers are set as slaves, is being recently used for distributing a load of a controller and quickly and accurately monitoring a whole state of a battery pack.

A slave controller equipped in each of a certain number of battery modules is connected to a master controller over a wired communication network such as a control area network (CAN), collects battery data of a battery module controlled by the slave controller, and transmits the battery data to the master controller.

Technology, which sets a short-range wireless channel between the master controller and the slave controller and performs short-range wireless communication between the master controller and the slave controller, has been proposed for preventing the non-efficiency of a space occurring in a case where the CAN is built for communication between the master controller and the slave controller However, like interference, the degradation in wireless signals, and a collision between the wireless signals, a case where wireless communication is unstable occurs frequently in a short-range wireless communication environment. In such a case where a state of a wireless communication channel is unstable, a situation where the master controller cannot obtain battery data from the slave controller or cannot control the slave controller at an appropriate time occurs, causing a problem where the total quality of a battery pack is degraded.

SUMMARY

Accordingly, the present disclosure is directed to providing a wireless battery management system, a node for wireless communication, and a method of transmitting data that substantially obviate one or more problems due to limitations and disadvantages of the related art.

An aspect of the present disclosure is directed to providing a wireless battery management system, a node for wireless communication, and a method of transmitting data, which support stable communication between a manager node set as a master and a monitor node set as a slave in a wireless communication environment.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a battery management system including: a manager node operating a primary channel and a secondary channel based on wireless communication and obtaining battery data from a monitor node by using the primary channel or the secondary channel; and a monitor node connected to a battery module to collect battery data including one or more of a current, a voltage, a temperature, and self-diagnosis data of the battery module, transmit the collected battery data to the manager node through the primary channel, and when the transmission of the battery data through the primary channel fails, transmit the battery data to the manager node through the secondary channel.

In another aspect of the present disclosure, there is provided a manager node including: a first wireless communication unit forming a primary channel based on a first frequency along with each of a plurality of monitor nodes collecting battery data; a second wireless communication unit forming a secondary channel based on a second frequency along with each of the plurality of monitor nodes; and a manager controller receiving battery data from each monitor node by using the first wireless communication unit, receiving battery data of a first monitor node by using the second wireless communication unit when communication of the first monitor node through the first wireless communication unit is impossible, and when communication of a second monitor node through the first and second wireless communication units is impossible, communicating with a third monitor node determined as a relay node by using the first wireless communication unit or the second wireless communication unit to receive battery data of the second monitor node from the third monitor node.

In another aspect of the present disclosure, there is provided a monitor node including: a wireless communication unit set to one of a primary channel and a secondary channel through frequency change to communicate with a monitor node; an interface connected to a battery module; and a monitor controller collecting battery data including one or more of a current, a voltage, a temperature, and self-diagnosis data of the battery module, transmit the collected battery data to a manager node by using one of the primary channel and the secondary channel set in the wireless communication unit, and when it is unable to transmit the battery data to the manager node by using the primary channel and the secondary channel, broadcasting the battery data to another peripheral monitor node to transmit the battery data to the manager node via a second monitor node determined as a relay node.

In another aspect of the present disclosure, there is provided a method of transmitting data, the method including: collecting battery data including one or more of a current, a voltage, a temperature, and self-diagnosis data of a battery module; transmitting the collected battery data to a manager node through a primary channel; and when the transmission of the collected battery data fails, transmitting the battery data to the manager node through the secondary channel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
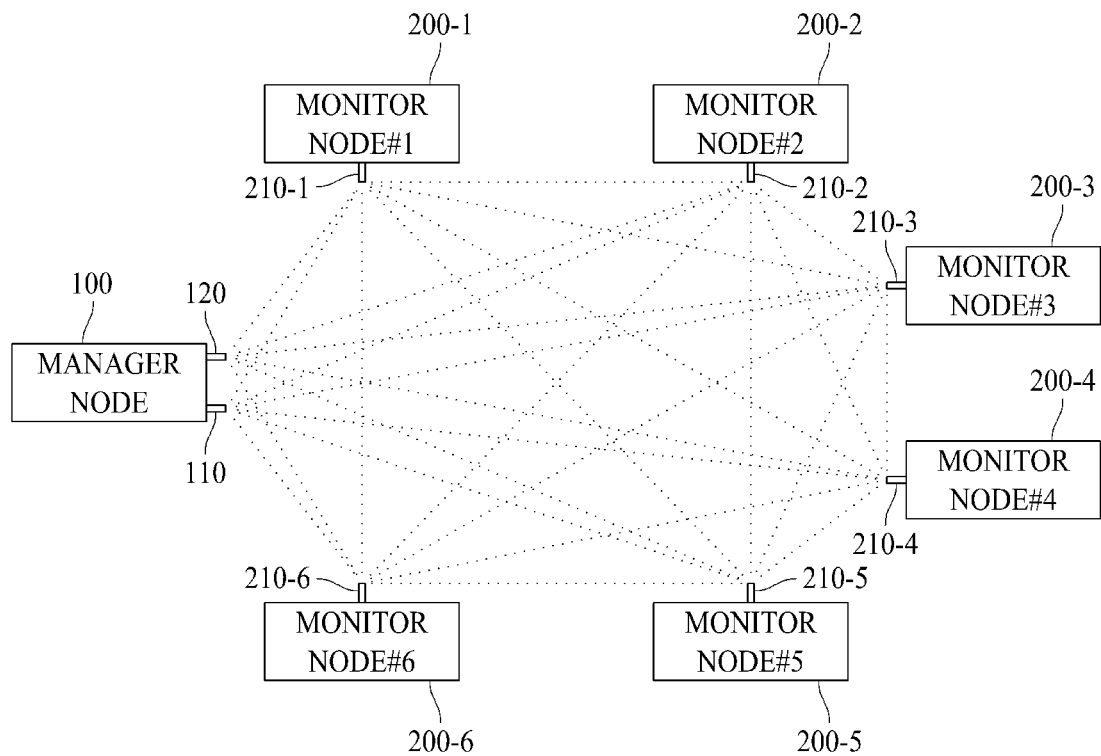
FIG. 1 is a diagram illustrating a battery management system according to an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

FIG. 1 is a diagram illustrating a battery management system according to an embodiment of the present disclosure.

As illustrated in FIG. 1, the battery management system according to an embodiment of the present disclosure may include a manager node 100 and a plurality of monitor nodes 200-N, and the manager node 100 and each of the monitor nodes 200-N may perform wireless communication therebetween.

In the battery management system according to an embodiment, the manager node 100 may include a controller set as a master, and each of the monitor nodes 200-N may include a controller set as a slave.

In an embodiment, the manager node 100 and each of the monitor nodes 200-N may perform wireless communication therebetween according to a short-range wireless communication protocol based on IEEE 802.15.4+. In another embodiment, the manager node 100 and each of the monitor nodes 200-N may perform wireless communication therebetween according to a protocol based on one of IEEE 802.11, IEEE 802.15, and IEEE 802.15.4, or may perform wireless communication therebetween according to a short-range wireless protocol based on another scheme.

Each of the monitor nodes 200-N may be equipped in one or more battery modules each including a set of cells and may collect battery data including a voltage, a current, a temperature, humidity, and the like occurring in the battery module. Also, each of the monitor nodes 200-N may autonomously inspect a state of a battery module equipped with a corresponding monitor node by measuring an analog front end (AFE) of the battery module and inspecting a state (i.e., diagnostic test) of the battery module, thereby generating a self-diagnosis data including an inspection result.

The manager node 100 may receive battery data, including one or more of a current, a voltage, a temperature, and self-diagnosis data, from each of the monitor nodes 200-N and may analyze the received battery data to monitor a state of each battery module or a state of a battery pack. The manager mode 100 may analyze data of each battery module received from each of the monitor nodes 200-N to estimate the state (for example, state of charge (SOC) and state of health (SOH)) of each battery module and a whole state of the battery pack.

According to an embodiment of the present disclosure, the manager node 100 may include two or more wireless communication units 110 and 120. Each of the wireless communication units 110 and 120 may include an antenna and a circuit for performing short-range wireless communication. One of the wireless communication units included in the manager node 100 may operate as a primary wireless communication unit 110, and the other wireless communication unit may operate as a secondary wireless communication unit 120. The primary wireless communication unit 110 may form a primary channel along with each of the monitor nodes 200-N by using a first frequency, and the secondary wireless communication unit 120 may form a secondary channel along with each of the monitor nodes 200-N by using a second frequency. Based on frequency interference between the primary channel and the secondary channel, a frequency of the primary channel and a frequency of the secondary channel may be set to a previously-set frequency value (for example, 30 MHz) or more so as to be apart from each other.

Moreover, the manager node 100 may preferentially obtain data of a battery module from each of the monitor nodes 200-N through the primary channel. When it is unable to communicate with a specific monitor node 200-N through the primary channel, the manager node 100 may obtain data of the specific monitor node 200-N through the secondary channel.

When it is unable to communicate with a specific monitor node 200-N through the primary channel and the secondary channel, the manager node 100 may obtain battery data of the specific monitor node 200-N from a monitor node 200-N set as a relay node.

As illustrated in FIG. 1, the nodes 100 and 200-N may perform short-range wireless communication therebetween to configure a mesh-type network. Also, a monitor node 200-N participating in the network may withdraw the network, and a new monitor node 200-N may participate in the network. The new monitor node 200-N participating in the network may broadcast identification information (for example, an address) thereof to notify the nodes 100 and 200-N, participating in the network, of the identification information thereof and may obtain identification information about each of the nodes 100 and 200-N participating in the network, thereby participating in the network.

When a new node (for example, a new monitor node 200-N) participates in the network, the manager node 100 may transmit, to the new monitor node 200-N, primary channel identification information (for example, a frequency of the primary channel) and secondary channel identification information (for example, a frequency of the secondary channel) about the primary channel and the secondary channel which are operating currently, and thus, may preferentially communicate with the new monitor node 200-N through the primary channel. When a state of the primary channel is abnormal, the manager node 100 may communicate with the new monitor node 200-N by using the secondary channel.

The manager node 100 may search for channels other than the primary channel and the secondary channel by using the primary wireless communication unit 110 or the secondary wireless communication unit 120, evaluate the quality of each of the channels, select a best-quality channel as a preliminary primary channel from among the channels, and select a best-quality channel as a preliminary secondary channel from among channels having a difference of a previously-set separation frequency (for example, 30 MHz) or more with respect to the preliminary primary channel. The preliminary primary channel and the preliminary secondary channel may be channels used as a primary channel and a secondary channel in a process of changing a channel. Such a channel search operation (i.e., channel scanning) may be repeated at a previously-set periodic interval, and thus, each of the preliminary primary channel and the preliminary secondary channel may be frequently changed.

In order to evaluate the quality of each of channels, the manager node 100 may frequently search for the channels by using the primary wireless communication unit 110 or the secondary wireless communication unit 120 and may perform energy detection and frame detection on each of found channels. The energy detection may be an operation of detecting an energy level of a frequency used for a corresponding channel, and as a result value having a dB unit is obtained and a value dB increases, a corresponding channel may be determined as a channel which is much used. Also, the frame detection may be an operation of checking whether there is a preamble of another data frame unused by the manager node 100, and frame detection or frame non-detection may be obtained as a result value. That is, the manager node 100 may measure an energy level value of a frequency used for a corresponding channel on the basis of energy detection and may check whether a data frame other than a data frame (see FIG. 2) according to the present disclosure is transmitted and received through the corresponding channel, based on frame detection. A weight value may be applied to an energy detection result value of a channel so that a quality evaluation value of the channel increases as the energy detection result value of the channel is lowered, and a weight value may be applied to a frame detection result value so that a quality evaluation value of a channel increases when a frame is not detected in the channel. Accordingly, the manager node 100 may determine, as a preliminary primary channel, a channel where a frame is not detected and an energy detection result value thereof is low.

The manager node 100 may continuously monitor whether a state of a currently-used primary channel is abnormal, and when it is determined that a channel state is abnormal, the manager node 100 may activate (i.e., flag=true) a channel change flag. Furthermore, the manager node 100 may broadcast, to all monitor nodes 200-N, channel change data including the activated channel change flag, identification information (for example, a frequency) about a currently-set preliminary primary channel, and identification information about a currently-set preliminary secondary channel.

When the channel change data is broadcasted, the manager node 100 and the monitor node 200-N may change a primary channel to the preliminary primary channel and a secondary channel to the preliminary secondary channel at a predetermined time. The predetermined time for the channel change may be a time after a certain time elapses from a time when the channel change data is broadcasted. In another embodiment, the manager node 100 may set a channel change time and may add the set channel change time to the channel change data, and in this case, the manager node 100 and the monitor node 200-N may change a primary channel and a secondary channel at the channel change time.

The manager node 100 and each of the monitor nodes 200-N may communicate with each other by using a data frame having a predefined format. The manager node 100 may transmit a beacon, placed at a first portion of the data frame, to each of the monitor nodes 200-N to synchronize a slot timing included in the data frame.

Figure 2:
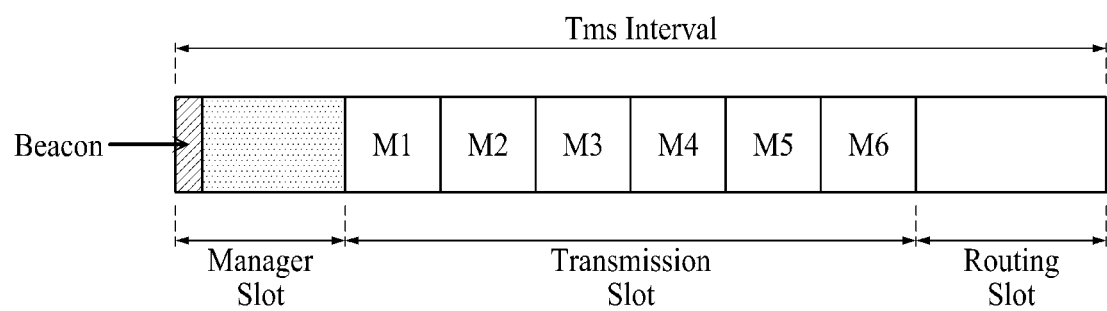
FIG. 2 is a diagram illustrating a data stream according to an embodiment of the present disclosure.

FIG. 2 is a diagram illustrating a data stream according to an embodiment of the present disclosure.

Referring to FIG. 2, a data stream used for wireless communication according to the present disclosure may include a plurality of time slots including a manager slot, a transmission slot, and a routing slot and may have a certain time length Tms. A predetermined time section may be allocated to the manager slot, the transmission slot, and the routing slot of the data stream, and an arrangement order of the manager slot, the transmission slot, and the routing slot may be constant. In the data stream, a first-arranged manager slot may be a dedicated slot used for the manager node 100 and may include a beacon. The beacon may perform a function of notifying the start of the data stream, and thus, may synchronize a slot timing. The manager node 100 may continuously transmit the beacon at a certain periodic interval. The manager node 100 may transmit the beacon through each of a primary channel and a secondary channel. In this case, the manager node 100 may differently or identically set a beacon transmission timing based on the primary channel and a beacon transmission timing based on the secondary channel.

Each of the monitor nodes 200-N may recognize a start time of the data stream on the basis of the beacon and may extract the manager slot, the transmission slot, and the routing slot each having a previously-allocated time from the data stream on the basis of the beacon. Also, each of the monitor nodes 200-N may determine a communication state of each of the primary channel and the secondary channel on the basis of whether a beacon signal is continuously received.

In the data stream, the manager slot may be a slot which is used for the manager node 100 to control each of the monitor nodes 200-N. The manager slot may include channel change data or a relay mode list.

The transmission slot may be a section where data of each of the monitor nodes 200-N is transmitted and may be a dedicated slot for each of the monitor nodes 200-N. The transmission slot may be divided based on the number of extensible monitor nodes 200-N or the number of monitor nodes which are currently communicating (i.e., participating in a network), and a divided transmission slot section may be allocated for a specific monitor node 200-N. In FIG. 2, the transmission slot may be divided into six sections, and it is illustrated that M1 is a dedicated slot allocated to a monitor node #1 200-1, M2 is a dedicated slot allocated to a monitor node #2 200-2, M3 is a dedicated slot allocated to a monitor node #3 200-3, M4 is a dedicated slot allocated to a monitor node #4 200-4, M5 is a dedicated slot allocated to a monitor node #5 200-5, and M6 is a dedicated slot allocated to a monitor node #6 200-6. Also, the routing slot may be a slot which is used when there is a monitor node 200-N which is impossible to perform communication through the primary channel and the secondary channel, a routing path of data and battery data may be recorded therein. An example where the routing slot is used will be described below in detail with reference to FIGS. 7 and 8.

The routing slot may not be a slot which is allocated to only one monitor node 200-N, and thus, when data is transmitted during the routing slot, a collision of data may occur. Therefore, each of the monitor nodes 200-N may apply identification information (for example, a host name, an address, a serial number, etc.) thereof to a random function as a seed, and then, may determine a result value of the random function as a transmission timing of the routing slot. An arbitrary time of a section where the routing slot is allocated may occur as the result value of the random function. For example, when the routing slot has a time section having a range from 91 ms to 100 ms, the result value of the random function may be one of 91, 92, 93, 94, 95, 96, 97, 98, 99, and 100, and the monitor node 200-N may determine the result value as a transmission timing of the routing slot. Also, the transmission timing determined based on the random function may overlap between the monitor nodes 200-N, and thus, each of the monitor nodes 200-N may not use a routing slot in another monitor node 200-N and may transmit data included in the routing slot at an exclusive time available thereby. In this case, each of the monitor nodes 200-N may exclusively transmit data during the routing slot on the basis of carrier sense multiple access with collision avoidance (CSMA-CA).

Each of the monitor nodes 200-N may include one wireless communication unit 210-N and may communicate with the manager node 100 and a peripheral monitor node 200-N by using the wireless communication unit 210-N. Each of the monitor nodes 200-N may collect battery data including one or more of a self-diagnosis result and sensing information (for example, a temperature, humidity, a voltage, a current, etc.) about one or more battery modules equipped with a corresponding monitor node and may report the battery data to the manager node 100, based on control by the manager node 100.

Each of the monitor nodes 200-N may preferentially communicate with the manager node 100 through a primary channel. In a case where performs communication through the primary channel, a wireless link may be formed between the primary wireless communication unit 110 of the manager node 100 and the wireless communication unit 210-N of the monitor node 200-N. When a communication state of the primary channel is abnormal, each of the monitor nodes 200-N may communicate with the manager node 100 by using a secondary channel instead of the primary channel.

Each of the monitor nodes 200-N may change a frequency of the wireless communication unit 210-N so that the primary channel and the secondary channel are alternately changed at a certain interval, and thus, may monitor whether the beacon is continuously received through the primary channel and the beacon is continuously received through the secondary channel, thereby checking a state of each of the primary channel and the secondary channel. When the beacon is normally received through the primary channel, each of the monitor nodes 200-N may communicate with the manager node 100 by using the primary channel, and when the beacon is not received through the primary channel (i.e., when the beacon is not received through the primary channel for a certain time), each of the monitor nodes 200-N may communicate with the manager node 100 by using the secondary channel.

When all of the primary channel and the secondary channel corresponding to the manager node 100 are abnormal, a corresponding monitor node 200-N may broadcast data, which is to be transferred to the manager node 100, to another peripheral monitor node 200-N, and thus, may allow data thereof to be transferred to the manager node 100 through one or more monitor nodes 200-N selected as a relay node. A method of setting a relay node in the manager node 100 will be described below in detail with reference to FIG. 9.

Figure 3:
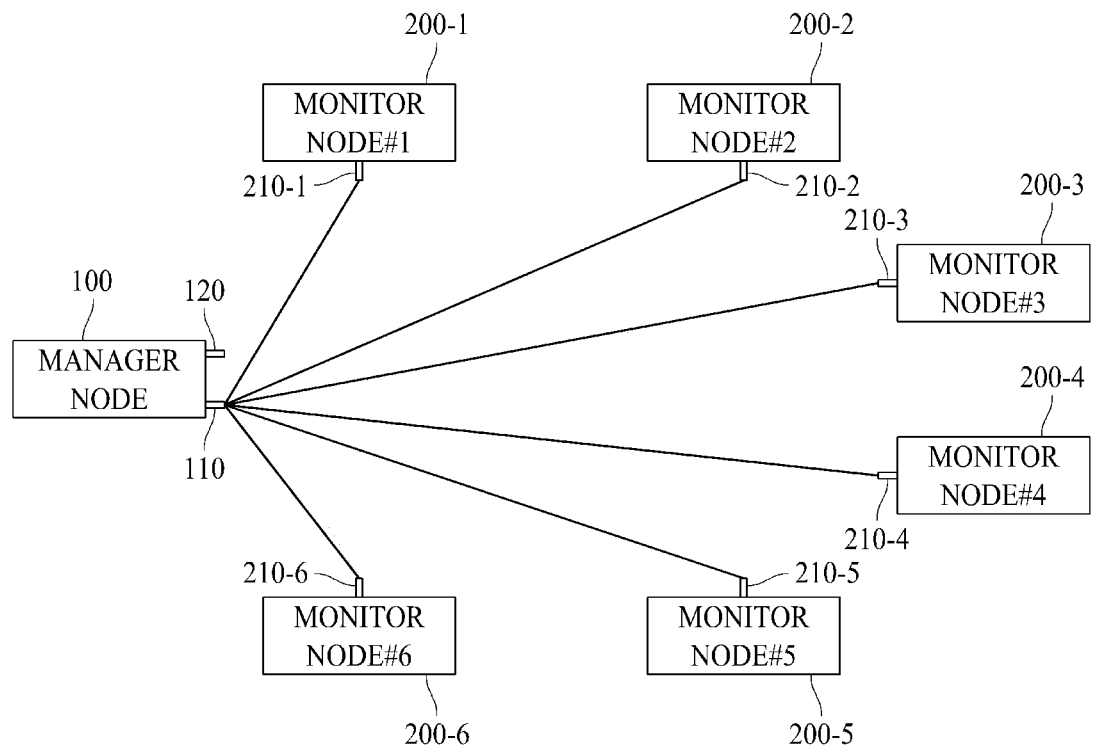
FIG. 3 is a diagram illustrating a network state occurring in a case where a manager node communicates with a monitor node by using only a primary channel.

FIG. 3 is a diagram illustrating a network state occurring in a case where a manager node communicates with a monitor node by using only a primary channel.

Figure 4:
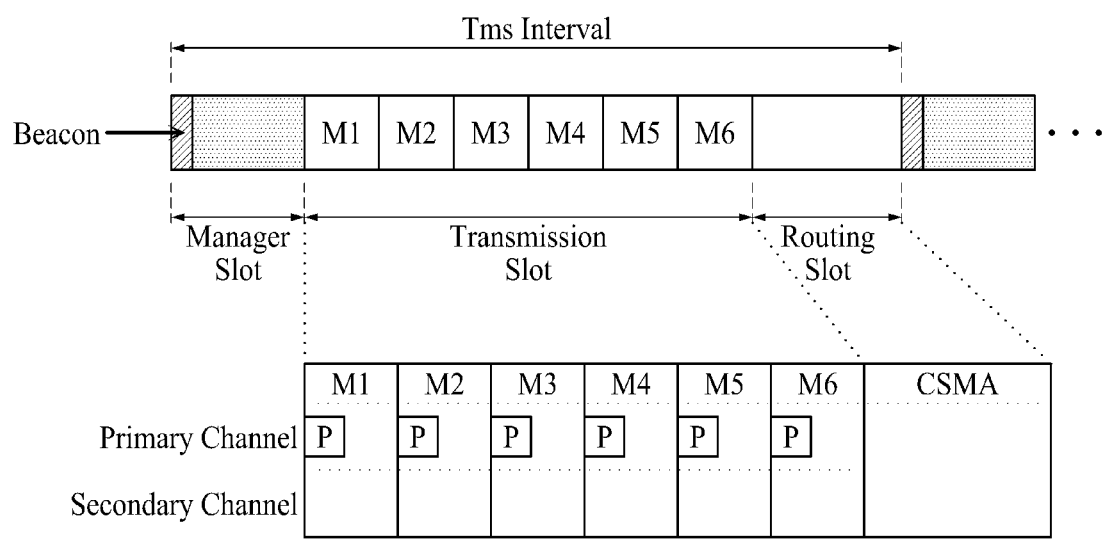
FIG. 4 is a diagram illustrating a data frame structure generated in a case where a manager node communicates with a monitor node by using only a primary channel.

FIG. 4 is a diagram illustrating a data frame structure generated in a case where a manager node communicates with a monitor node by using only a primary channel.

Referring to FIGS. 3 and 4, when all primary channels between a manager node 100 and a plurality of monitor nodes 200-N operate normally, data transmitted and received between the manager node 100 and each of the monitor nodes 200-N may pass through a primary channel, and the manager node 100 may communicate with each of the monitor nodes 200-N by using a primary wireless communication unit 110. In FIG. 3, a wireless link formed between the manager node 100 and each of the monitor nodes 200-N is illustrated as a solid line.

As illustrated in FIG. 4, battery data transmitted from each of a plurality of monitor nodes 200-N to a manager node 100 may be transmitted through a primary channel, and when all of primary channels are normal, the battery data may not be included in a secondary channel and a routing slot. In FIG. 4, "P" in a tetragonal box may denote battery data collected by a corresponding monitor node 200-N.

In a state where a primary channel is being used, communication of a primary channel which is being used between a specific monitor node 200-3 and a manager node 100 is impossible, and thus, a secondary channel may be used for the specific monitor node 200-3.

Figure 5:
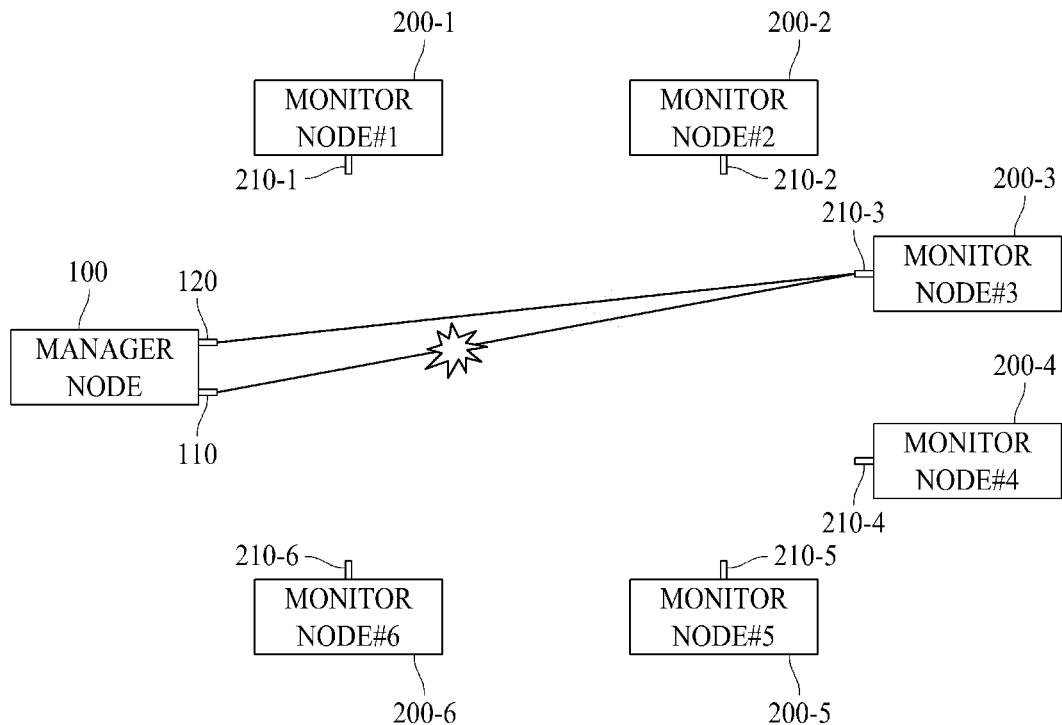
FIG. 5 is a diagram illustrating a network state occurring in a case where a manager node communicates with a monitor node by using a secondary channel.

FIG. 5 is a diagram illustrating a network state occurring in a case where a manager node communicates with a monitor node by using a secondary channel.

Figure 6:
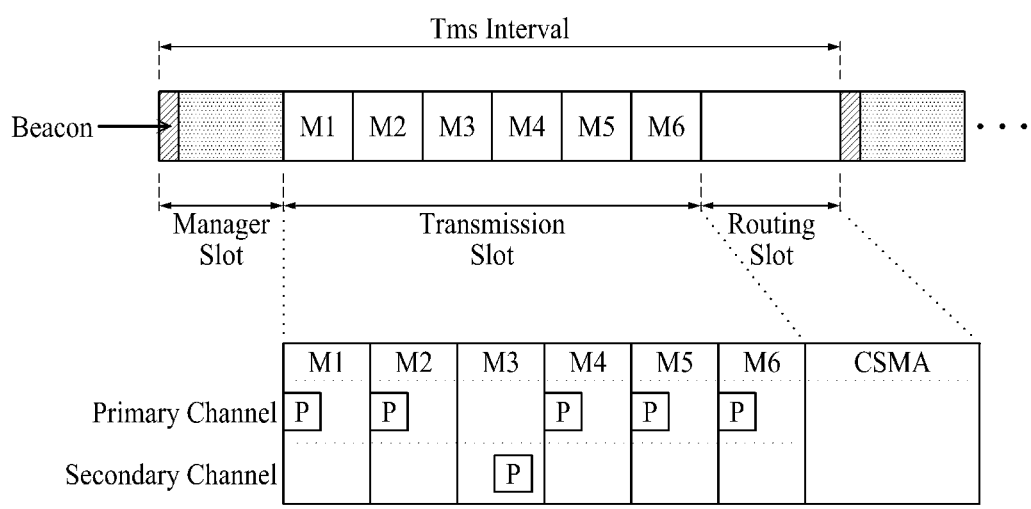
FIG. 6 is a diagram illustrating a data frame structure generated in a case where a manager node communicates with a monitor node by using a secondary channel.

FIG. 6 is a diagram illustrating a data frame structure generated in a case where a manager node communicates with a monitor node by using a secondary channel.

In FIGS. 5 and 6, it is illustrated that primary channel communication between a monitor node #3 200-3 and a manager node 100 is impossible, and thus, the monitor node #3 200-3 and the manager node 100 perform communication through a secondary channel. When it is sensed that a state of a primary channel is abnormal, the monitor node #3 200-3 may transmit battery data through the secondary channel. For example, the monitor node #3 200-3 may transmit the battery data to the manager node 100 by using the primary channel during a transmission slot allocated thereto, but a response ACK corresponding thereto may not be received through the primary channel for a predetermined time. In this case, the monitor node #3 200-3 may determine that communication of the primary channel is impossible, change a frequency of a wireless communication unit 210-3 to a frequency of a secondary channel, and transmit the battery data through the secondary channel instead of the primary channel. As another example, when a beacon signal is not received through the primary channel for a predetermined time, the monitor node #3 200-3 may change the frequency of the wireless communication unit 210-3 to the frequency of the secondary channel and may transmit the battery data through the secondary channel instead of the primary channel.

FIG. 6 illustrates a data frame when the secondary channel is used for only communication between the monitor node #3 200-3 and the manager node 100 and the other monitor nodes 200-1, 200-2, 200-4, 200-5, and 200-6 perform communication by using the primary channel. As illustrated in FIG. 6, data of the monitor node #3 200-3 may be transmitted to the manager node 100 through the secondary channel, and battery data of the other monitor node #1 200-1, monitor node #2 200-2, monitor node #4 200-4, monitor node #5 200-5, monitor node #6 200-6 may be transmitted through the primary channel.

When communications of all of the primary channel and the secondary channel are abnormal, the monitor node 200-N may transmit battery data to the manager node 100 by using another monitor node 200-N selected as a relay node.

Figure 7:
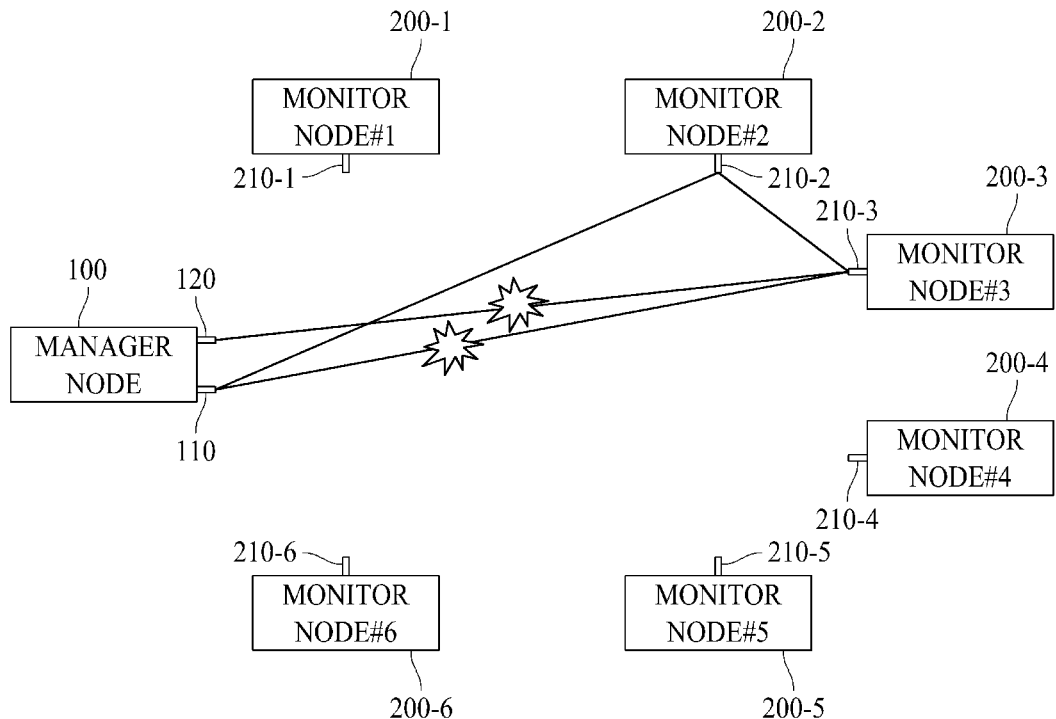
FIG. 7 is a diagram illustrating an example where data of a monitor node is provided to a manager node via another monitor node.

FIG. 7 is a diagram illustrating an example where data of a monitor node is provided to a manager node via another monitor node.

Figure 8:
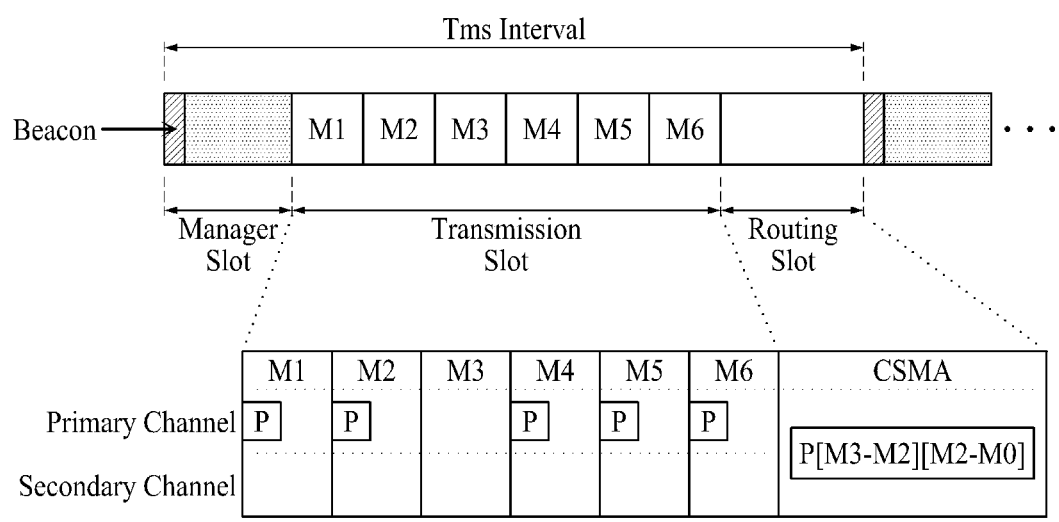
FIG. 8 is a diagram illustrating a data frame structure generated in a case where a manager node communicates with a monitor node by using another monitor node.

FIG. 8 is a diagram illustrating a data frame structure generated in a case where a manager node communicates with a monitor node by using another monitor node.

One or more monitor nodes 200-N may be selected as relay nodes from among a plurality of monitor nodes 200-N. The selection of the relay nodes may be determined by a manager node 100. The manager node 100, as described below with reference to FIG. 9, may select a relay node on the basis of a received signal strength (for example, a received signal strength indicator (RSSI)) of each of the monitor nodes 200-N.

In FIGS. 7 and 8, it is illustrated that a monitor node #2 200-2 is selected as a relay node and routes data of a monitor node #3 200-3 to the manager node 100.

When it is sensed that all of a primary channel and a secondary channel are impossible to communicate, the monitor node #3 200-3 may broadcast battery data, which is to transmitted to the manager node 100, to the other monitor nodes 200-1, 200-2, 200-4, 200-5, and 200-6. For example, the monitor node #3 200-3 may transmit the battery data to the manager node 100 by using the secondary channel during a dedicated transmission slot, but when a response ACK of the manager node 100 is not received through the secondary channel for a predetermined time, the monitor node #3 200-3 may determine that communication of the secondary channel as well as the primary channel is impossible, the monitor node #3 200-3 may broadcast the battery data to peripheral monitor nodes 200-1, 200-2, 200-4, 200-5, and 200-6. In this case, the monitor node #3 200-3 may broadcast the battery data by using one or all of the primary channel and the secondary channel. In order to prevent a data collision with another monitor node, the monitor node #3 200-3 may transmit battery data included in the routing slot at an exclusive time enabling the use of only a routing slot thereof without using a routing slot of the other monitor node. In this case, the monitor node #3 200-3 may broadcast the battery data during the routing slot on the basis of CSMA-CA. Then, the monitor node #2 200-2 selected as a relay node may transfer the battery data, received from the monitor node #3 200-3, to the manager node 100. Likewise, the monitor node #2 200-2 may transfer data of the monitor node #3 200-3 to the manager node 100 on the basis of CSMA-CA.

Monitor nodes unselected as relay nodes may ignore data received from the monitor node #3 200-3 without routing the received data.

In FIG. 7, it is illustrated that communications of all of the primary channel and the secondary channel between the manager node 100 and the monitor node #3 200-3 are impossible, and thus, the battery data of the monitor node #3 200-3 is routed through the monitor node #2 200-2 which is a relay node.

FIG. 8 illustrates data frame when battery data is routed between the monitor node #3 200-3 and the manager node 100 by using a relay node and the other monitor nodes 200-1, 200-2, 200-4, 200-5, and 200-6 perform direct communication by using the primary channel. As illustrated in FIG. 8, data transmitted and received between the monitor node #3 200-3 and the manager node 100 may be transmitted and received during a routing slot. Node information (i.e., routing information) about transmission of corresponding data may be recorded in the routing slot, and a third party node which has received data through the routing slot may transmit data or a response ACK to a corresponding node in the reverse order of corresponding routing information. A routing slot illustrated in FIG. 8 may represent that data is sequentially transmitted to the monitor node #3 200-3, the monitor node #2 200-2, and the manager node 100 (i.e., monitor node #3 200-3→monitor node #2 200-2→manager node 100).

Figure 9:
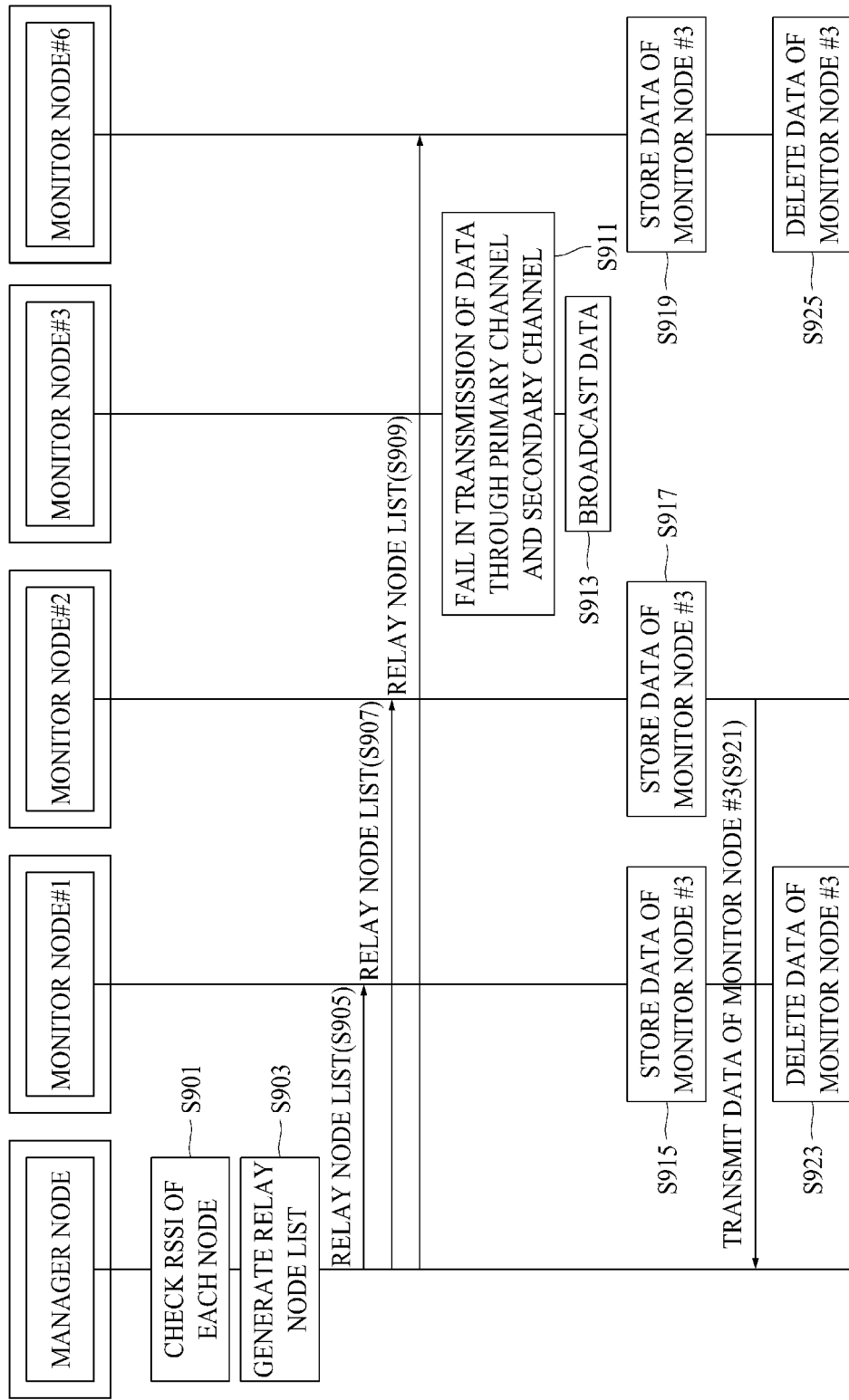
FIG. 9 is a flowchart describing a process of setting a relay node and routing battery data through the relay node, according to an embodiment of the present disclosure.

FIG. 9 is a flowchart describing a process of setting a relay node and routing battery data through the relay node, according to an embodiment of the present disclosure.

Referring to FIG. 9, when data is received from each of a plurality of monitor nodes 200-N, a manager node 100 may check a received signal strength of each monitor node 200-N occurring at a time when the data is received in operation S901. The received signal strength may be measured based on a wireless signal which is transmitted from each monitor node 200-N and is received by the manager node 100, and the manager node 100 may use an RSSI as the received signal strength.

Subsequently, the manager node 100 may sort the received signal strengths of the monitor nodes 200-N in a level order, select monitor nodes, corresponding to a certain priority (for example, No. 3 priority), as relay nodes from among the monitor nodes 200-N, and generate a relay node list including identification information about the monitor nodes selected as the relay nodes in operation S903. At this time, the manager node 100 may assign a priority to each of the monitor nodes 200-N in the order of levels of received signal strengths and may add priority information thereof to the relay node list. In FIG. 9, it may be assumed that a monitor node #1 200-1, a monitor node #2 200-2, and a monitor node #6 200-6 are selected as relay nodes and a priority is the order of the monitor node #2 200-2, the monitor node #1 200-1, and the monitor node #6 200-6.

Subsequently, the manager node 100 may transmit the relay node list to monitor nodes 200-1, 200-2, and 200-6 selected as relay nodes in operations S905, S907, and S909 and may allow the relay node list in the monitor nodes 200-1, 200-2, and 200-6. In another embodiment, the manager node 100 may broadcast the relay node list. Also, the manager node 100 may frequently check the received signal strengths of the monitor nodes 200-N to generate a new relay node list and may transmit the new relay node list to the monitor nodes 200-N to update a pre-stored relay node list.

In a state where a relay node is selected in this manner, when data transmission based on all of a primary channel and a secondary channel fails, a monitor node #3 200-3 may broadcast battery data to the other monitor nodes 200-1, 200-2, 200-4, 200-5, and 200-6 at a time enabling the exclusive use of a routing slot in operations S911 and S913. In this case, the monitor node #3 200-3 may broadcast the battery data by using one or all of the primary channel and the secondary channel. Also, the monitor node #3 200-3 may broadcast the battery data during a routing slot section.

When the broadcasted battery data is received, each of the monitor node #1 200-1, the monitor node #2 200-2, and the monitor node #6 200-6 selected as the relay nodes may temporarily store the battery data in operations S915, S917, and S919. Even when the battery data is received from the monitor node #3 200-3, the monitor nodes 200-4 and 200-5 unselected as a relay node may delete the battery data without storing the battery data. Some of the monitor nodes 200-1, 200-2, and 200-6 selected as relay nodes may not receive the battery data on the basis of a communication state with the monitor node #3 200-3. In this case, a plurality of relay nodes may be determined.

When the monitor node #2 200-2 determined as No. 1 priority among relay nodes receives the broadcasted battery data, the monitor node #2 200-2 may transmit the battery data to the manager node 100 by using the primary channel or the secondary channel in operation S921. Likewise, the monitor node #2 200-2 may transmit the battery data to the manager node 100 at a time enabling the exclusive use of a routing slot.

The monitor node #1 200-1 and the monitor node #6 200-6, which are selected as relay nodes and are low in priority, may monitor whether battery data is routed by the monitor node #2 200-2. The monitor node #1 200-1 and the monitor node #6 200-6 may check whether the battery data is routed to the manager node 100 during a routing slot of the primary channel or the secondary channel, thereby determining whether the monitor node #2 200-2 normally routes the battery data.

When it is determined that the monitor node #2 200-2 normally routes battery data of the monitor node #3 200-3 as a result of the monitoring (i.e., when the battery data is transmitted to the manager node), the monitor node #1 200-1 and the monitor node #6 200-6 may delete the temporarily stored data of the monitor node #3 200-3 in operations S923 and S925.

In a case where the monitor node #2 200-2 cannot transmit the battery data of the monitor node #3 200-3 to the manager node 100 for a predetermined time, the monitor node #1 200-1 corresponding to No. 2 priority may transmit the temporarily stored battery data of the monitor node #3 200-3 to the manager node 100. Also, even in a case where the monitor node #1 200-1 cannot transmit the battery data of the monitor node #3 200-3 to the manager node 100, the monitor node #6 200-6 corresponding to No. 3 priority may transmit the temporarily stored battery data of the monitor node #3 200-3 to the manager node 100.

Moreover, a routing path of battery data may be recorded in a routing slot. When the manager node 100 receives the battery data of the monitor node #3 200-3, the manager node 100 may transmit a response ACK to the monitor node #3 200-3 in the reverse order of the routing path.

As described above, when the monitor node #2 200-2 which is a No. 1-priority relay node routes the battery data of the monitor node #3 200-3 but routing performed by the No. 1-priority relay node fails, a No. 2-priority relay node and a No. 3-priority relay node may sequentially perform routing of the battery data.

Figure 10:
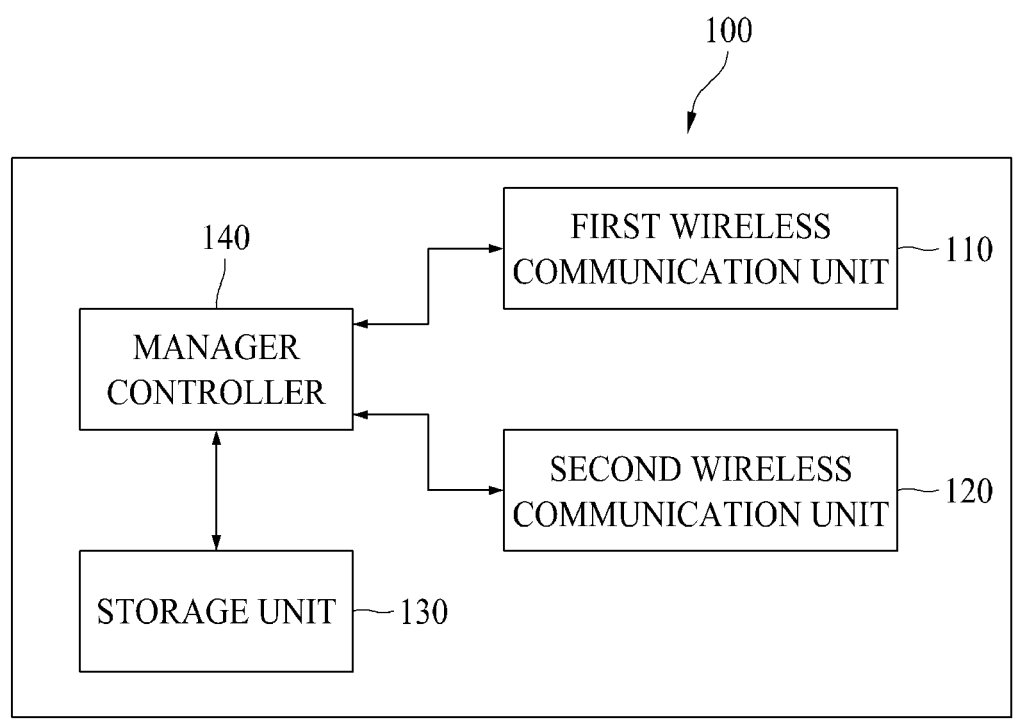
FIG. 10 is a diagram illustrating a configuration of a manager node according to an embodiment of the present disclosure.

FIG. 10 is a diagram illustrating a configuration of a manager node 100 according to an embodiment of the present disclosure.

As illustrated in FIG. 10, the manager node 100 according to an embodiment of the present disclosure may include a first wireless communication unit 110, a second wireless communication unit 120, a storage unit 130, and a manager controller 140.

The first wireless communication unit 110 may be the above-described primary wireless communication unit and may form a primary channel along with a monitor node 200-N.

The second wireless communication unit 120 may be the above-described secondary wireless communication unit and may form a secondary channel along with the monitor node 200-N.

The first wireless communication unit 110 and the secondary wireless communication unit 120 may each include a radio frequency (RF) circuit for performing short-range wireless communication. Also, each of the first wireless communication unit 110 and the second wireless communication unit 120 may broadcast a beacon at a certain periodic interval. A transmission timing of a beacon transmitted by the first wireless communication unit 110 may be the same as or different from a transmission timing of a beacon transmitted by the second wireless communication unit 120.

The storage unit 130 may be a storage means such as a memory or a disk device and may store various programs and data for operating the manager node 100. Particularly, the storage unit 130 may store a program (or an instruction set) where an algorithm for executing an operation of the manager node 100 described above is defined. Also, the storage unit 130 may store battery data received from each of a plurality of monitor nodes 200-N.

The manager controller 140, an operation processing device such as a microprocessor, may control an overall operation of the manager node 100 and may generate data for controlling the monitor nodes 200-N. The manager controller 140 may install data, associated with the program (or the instruction set) stored in the storage unit 130, in a memory and may perform wireless communication and a channel change operation according to an embodiment of the present disclosure.

The manager controller 140 may obtain the battery data of each monitor nodes 200-N by using the first wireless communication unit 110 or the second wireless communication unit 120 and may analyze the battery data to check states of battery modules including the monitor node 200-N. Also, the manager controller 140 may overall analyze the battery data to check a state of a battery pack and may control charging and discharging, based thereon.

According to an embodiment of the present disclosure, the manager controller 140 may set a frequency of the first wireless communication unit 110 to a first frequency of a primary channel and may form a short-range wireless link along with each of the monitor nodes 200-N by using the first wireless communication unit 110. Also, the manager controller 140 may set a frequency of the second wireless communication unit 120 to a second frequency of a secondary channel and may form a short-range wireless link along with one or more monitor nodes 200-N by using the second wireless communication unit 120. Also, the manager controller 140 may communicate with the monitor nodes 200-N by preferentially using the first wireless communication unit 110, and when it is impossible to communicate with a specific monitor node 200-N through the primary channel (i.e., by using the first wireless communication unit), the manager controller 140 may communicate with the specific monitor node 200-N by using a secondary channel formed by the second wireless communication unit 120.

Moreover, the manager controller 140 may search for channel other than the primary channel and the secondary channel by using the second wireless communication unit 120 or the first wireless communication unit 110, evaluate the quality of each of found channels, and select a best-quality channel as a preliminary primary channel from among the found channels. Also, the manager controller 140 may select a best-quality channel as a preliminary secondary channel from among channels having a difference of a previously-set separation frequency (for example, 30 MHz) or more with respect to the preliminary primary channel.

In order to evaluate the quality of each of channels, the manager controller 140 may frequently search for the channels by using the primary wireless communication unit 110 or the secondary wireless communication unit 120 and may perform energy detection and frame detection on each of found channels. Subsequently, the manager controller 140 may apply a first weight value to an energy detection result value of each channel, apply a second weight value to a frame detection result value of each channel, and summate a weight-applied energy detection result value and a weight-applied frame detection result value, thereby evaluating the quality of each channel as a numerical value.

The manager controller 140 may continuously monitor a state of the primary channel which is currently set. The manager controller 140 may check the degree of degradation of the primary channel on the basis of one or more of the number of non-receptions of data or ACK, an energy detection result value of the primary channel, and a frame detection result value of the primary channel. In this case, the manager controller 140 may apply a third weight value to the number of non-receptions of data, apply a fourth weight value to the energy detection result value of the primary channel, apply a fifth weight value to the frame detection result value of the primary channel, and summate a weight-applied number of non-receptions, a weight-applied energy detection result value, and a weight-applied frame detection result value, thereby checking the degree of degradation of the primary channel as a numerical value. The first weight value may be the same as the fourth weight value, and the second weight value may be the same as the fifth weight value.

When it is determined that the primary channel is degraded, the manager controller 140 may perform a process of changing a channel. In detail, when it is determined that the primary channel is degraded, the manager controller 140 may activate (i.e., flag=true) a channel change flag and may check identification information about a currently-set preliminary primary channel and identification information about a currently-set preliminary secondary channel. Furthermore, the manager controller 140 may broadcast, to all monitor nodes 200-N, channel change data including channel change flag activation information, the identification information about the preliminary primary channel, and the identification information about the preliminary secondary channel. In this case, the manager controller 140 may broadcast the channel change data by using all of the first wireless communication unit 110 and the second wireless communication unit 120. At this time, the manager controller 140 may broadcast the channel change data during a manager slot among slots of data frame. Also, the manager controller 140 may add a channel change time to the channel change data.

When the channel change flag is activated, at the channel change time, the manager controller 140 may change a frequency of the first wireless communication unit 110 to a frequency of the preliminary primary channel to change the primary channel and may change a frequency of the second wireless communication unit 120 to a frequency of the preliminary secondary channel to change the secondary channel. When the channel change operation is completed, the manager controller 140 may deactivate (i.e., flag=false) the channel change flag.

Moreover, as described above with reference to FIG. 9, the manager controller 140 may measure an RSSI of each monitor node 200-N by using one or more of the first wireless communication unit 110 and the second wireless communication unit 120 and may generate a relay node list including a priority and identification information about a relay node on the basis of the RSSI of each monitor node 200-N. The manager controller 140 may broadcast the relay node list to the monitor nodes 200-N, or may multicast the relay node list to the monitor nodes 200-N included in the relay node list.

Figure 11:
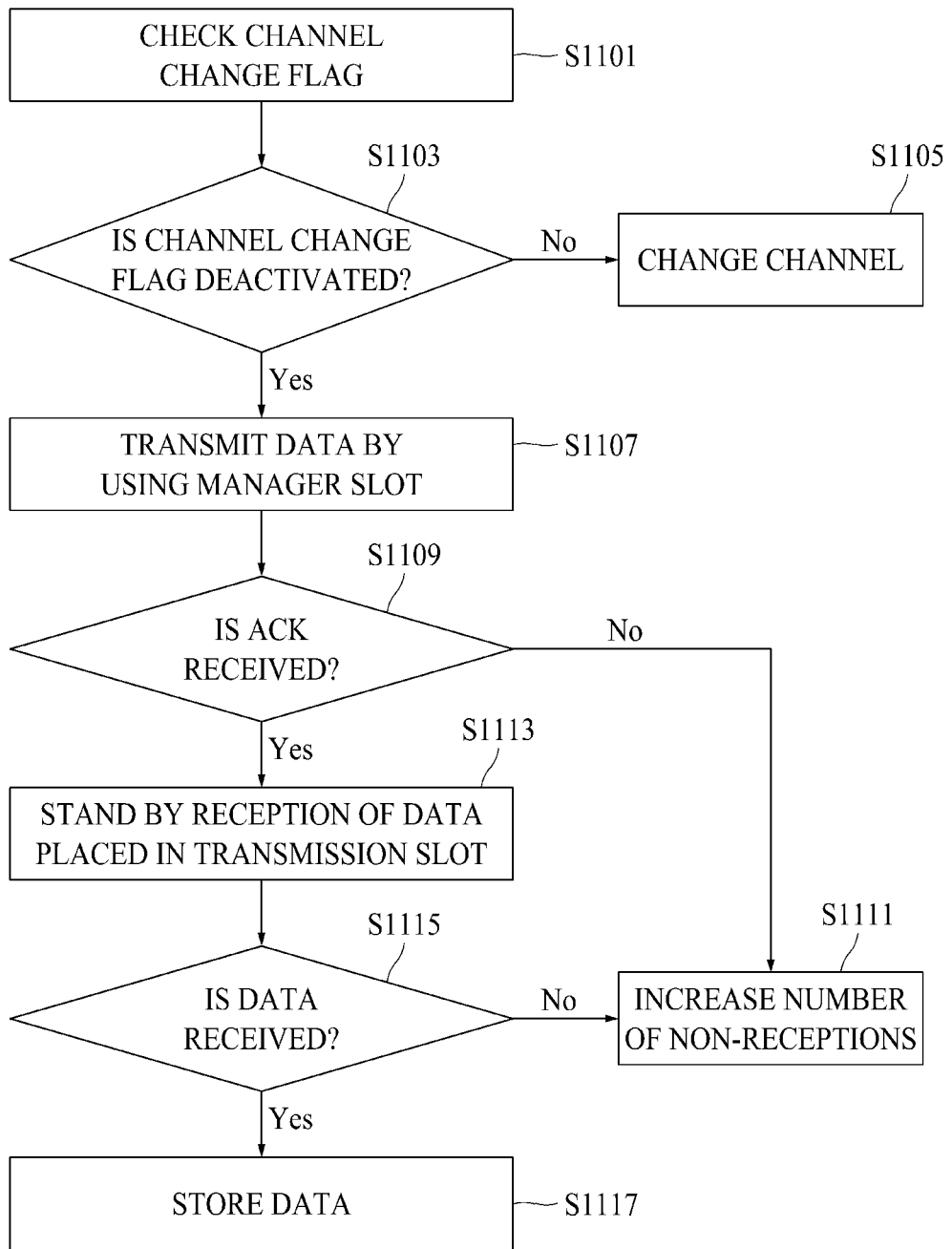
FIG. 11 is a flowchart describing a periodic operation of a manager node, according to an embodiment of the present disclosure.

FIG. 11 is a flowchart describing a periodic operation of a manager node, according to an embodiment of the present disclosure.

Referring to FIG. 11, when an operation period arrives, the manager controller 140 may check whether a channel change flag is activated in operation S1101.

When the channel change flag is activated in operation S1103 (No), at a predetermined time, the manager controller 140 may change a frequency of the first wireless communication unit 110 to a frequency of a preliminary primary channel to change a primary channel and may change a frequency of the second wireless communication unit 120 to a frequency of a preliminary secondary channel to change a secondary channel in operation S1105. When such a channel change operation is completed, the manager controller 140 may deactivate (i.e., flag=false) the channel change flag.

When the channel change flag is deactivated in operation S1103 (Yes), the manager controller 140 may transmit data including a beacon and a control instruction to the monitor node 200-N by using each of the first wireless communication unit 110 and the second wireless communication unit 120 during a manager slot in operation S1107. That is, the manager controller 140 may transmit the data to each of the primary channel and the secondary channel. In FIG. 11, the control instruction is described as an instruction for requesting battery data.

Subsequently, by using the first wireless communication unit 110 and the second wireless communication unit 120, the manager controller 140 may check whether a response ACK representing the normal reception or not of the data is received from all monitor nodes 200-N, and when there is a monitor node 200-N from which the response ACK is not received in operation S1109 (No), the manager controller 140 may increase the number of non-receptions in proportion to the number of not received responses ACK in operation S1111. The number of non-receptions may be used to calculate the degree of degradation of the primary channel.

On the other hand, when the response ACK is received from all monitor nodes 200-N in operation S1109 (Yes), the manager controller 140 may stand by reception of battery data of each of the monitor nodes 200-N based on the control instruction in operation S1113. When the battery data based on the control instruction is not received from one or more monitor nodes 200-N and the omission of data occurs in operation S1115 (No), the manager controller 140 may increase the number of non-receptions in proportion to the number of omitted battery data in operation S1111.

When the battery data based on the control instruction is received from all monitor nodes 200-N, the manager controller 140 may store data, received from each of the monitor nodes 200-N, in the storage unit 130 in operation S1117.

A procedure illustrated in FIG. 11 described above may correspond to one cycle, and the manager controller 140 may repeat each operation of FIG. 11 at a certain periodic interval.

Figure 12:
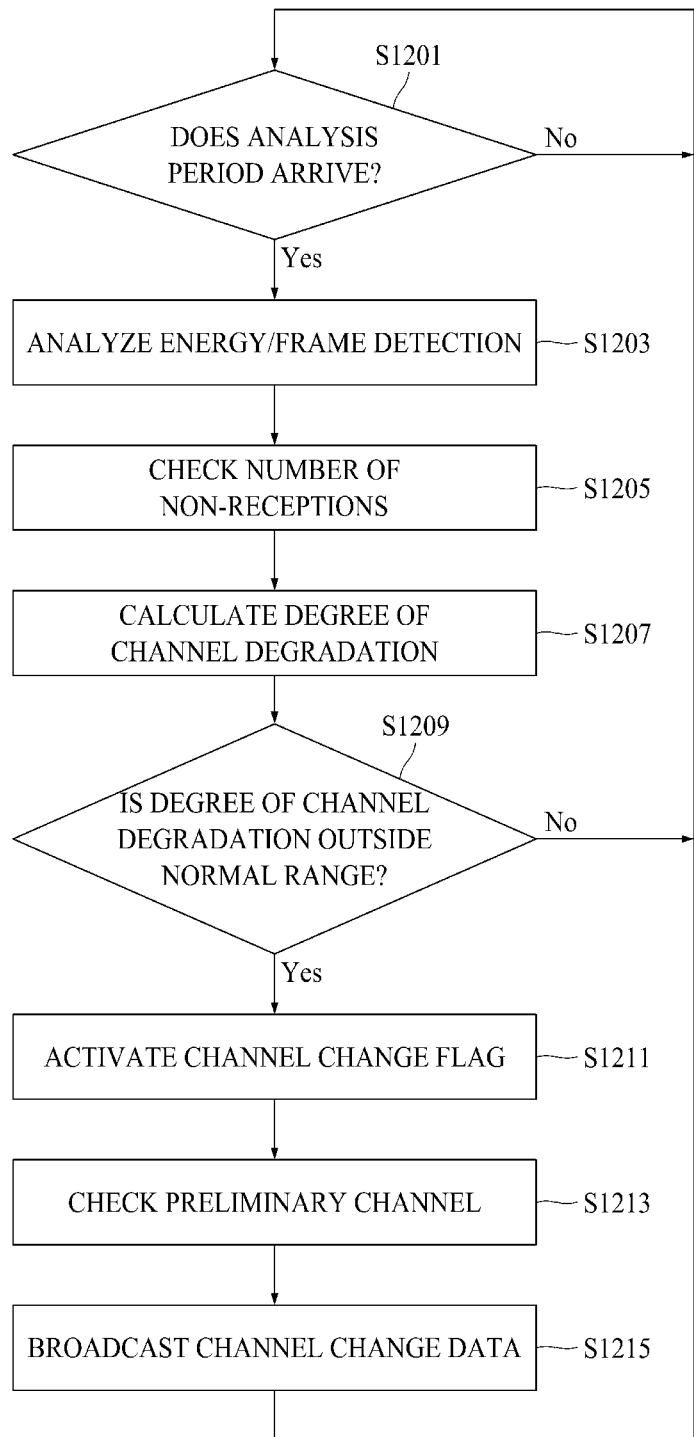
FIG. 12 is a flowchart describing a method of activating a channel change flag in a manager node, according to an embodiment of the present disclosure.

FIG. 12 is a flowchart describing a method of activating a channel change flag in a manager node, according to an embodiment of the present disclosure.

Referring to FIG. 12, the manager controller 140 of the manager node 100 may monitor whether a predetermined analysis period arrives, and when the predetermined analysis period arrives in operation S1201 (Yes), by using the first wireless communication unit 110, the manager controller 140 may perform energy detection and frame detection on a primary channel, and then, may check an energy detection result value and a frame detection result value of the primary channel in operation S1203.

Subsequently, the manager controller 140 may check the currently-counted number of non-receptions in operation S1205, may apply different weight values to the number of non-receptions and the energy detection result value and the frame detection result value of the primary channel, and summate a weight-applied number of non-receptions, a weight-applied energy detection result value, and a weight-applied frame detection result value to calculate the degree of channel degradation in operation S1207.

Subsequently, the manager controller 140 may check whether the calculated degree of channel degradation is within a predetermined normal range, and when the degree of channel degradation is outside the normal range in operation S1209 (Yes), the manager controller 140 may start a channel change process. That is, the manager controller 140 may activate a channel change flag which is currently set to be deactivated in operation S1211 and may check a preliminary primary channel and a preliminary secondary channel which are currently set in operation S1213. Subsequently, the manager controller 140 may broadcast, to all monitor nodes 200-N, channel change data including the activated channel change flag, identification information about the preliminary primary channel, and identification information about the preliminary secondary channel in operation S1215. In this case, the manager controller 140 may broadcast the channel change data to the primary channel and the secondary channel by using all of the first wireless communication unit 110 and the second wireless communication unit 120. The channel change data may be broadcasted during a manager slot of a data frame.

Figure 13:
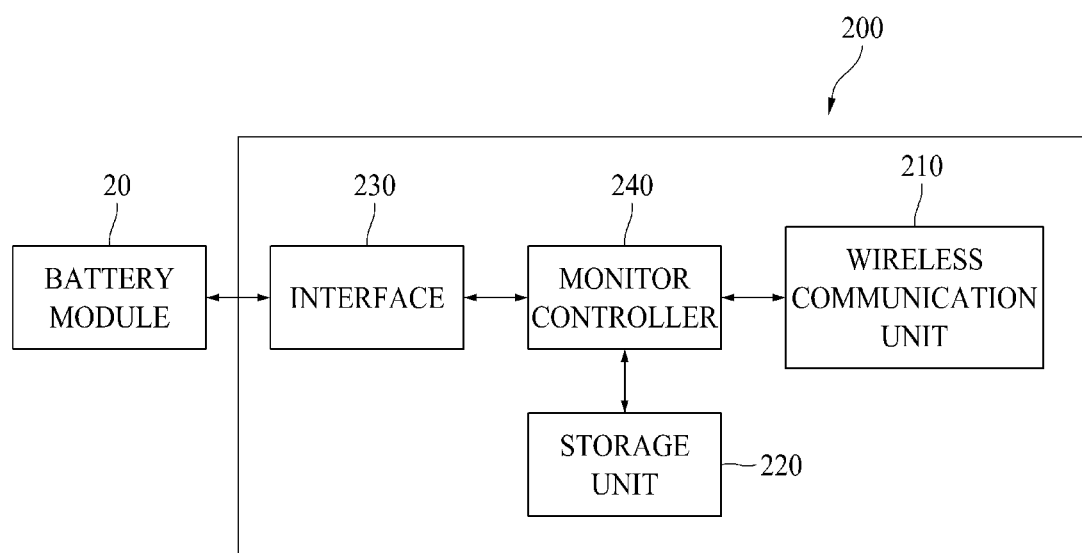
FIG. 13 is a diagram illustrating a configuration of a monitor node according to an embodiment of the present disclosure.

FIG. 13 is a diagram illustrating a configuration of a monitor node 200 according to an embodiment of the present disclosure.

As illustrated in FIG. 13, the monitor node 200 according to an embodiment of the present disclosure may include a wireless communication unit 210, a storage unit 220, an interface 230, and a monitor controller 240.

The wireless communication unit 210 may preferentially communicate with a manager node 100 through a primary channel, and when communication of the primary channel is impossible, the wireless communication unit 210 may communicate with the manager node 100 by changing a frequency thereof to a frequency of a secondary channel. The wireless communication unit 210 may include an RF circuit for performing short-range wireless communication. The wireless communication unit 210 may change a frequency thereof so that the primary channel and the secondary channel are alternately changed at a certain time interval. Therefore, the monitor node 200 may monitor states of the primary channel and the secondary channel despite using one wireless communication unit 210.

The storage unit 220 may be a storage means such as a memory or a disk device and may store various programs and data for operating the monitor node 200. Particularly, the storage unit 220 may store a program (or an instruction set) where an algorithm for executing an operation of the monitor node 200 described above is defined.

The interface 230 may be an element which supports a communication connection with a battery module 20 equipped with the monitor node 200 and may use a bus cable, a cable, or the like, or may use CAN communication. The monitor node 200 may obtain, through the interface 230, battery data generated in the battery module 20.

The manager controller 240, an operation processing device such as a microprocessor, may control an overall operation of the monitor node 200. The monitor controller 240 may install data, associated with the program (or the instruction set) stored in the storage unit 220, in a memory and may perform wireless communication and a channel change operation according to an embodiment of the present disclosure.

The monitor controller 240 may obtain various data such as a temperature, a current, and a voltage of the battery module 20 through the interface 230 and may measure an AFE of the battery module 20 and may inspect a state (i.e., diagnostic test) of the battery module 20. Also, the monitor controller 240 may transmit battery data, including one or more of a current, a voltage, a temperature, and self-diagnosis data, to the manager node 100 by using the wireless communication unit 210. According to an embodiment of the present disclosure, the monitor controller 240 may determine whether a beacon of the primary channel and a beacon of the secondary channel are continuously received from the wireless communication unit 210, thereby checking a communication state of each of the primary channel and the secondary channel. The monitor controller 240 may determine, as a communication-disabled channel, a channel through which a beacon is not received for a certain time or more.

When communications of all of the primary channel and the secondary channel are possible, the monitor controller 240 may communicate with the manager node 100 by using the primary channel. When it is determined that communication of the primary channel is impossible, the monitor controller 240 may communicate with the manager node 100 by using the secondary channel. The monitor controller 240 may transmit battery data to the manager node 100 through communication based on the primary channel or the secondary channel and may receive control data, such as a channel change indication, an inspection indication, and a data report indication, from the manager node 100.

When a relay node list is received from the manager node 100, the monitor controller 240 may store the relay node list in the storage unit 220. When the relay node list includes identification information about the monitor node 200 equipped with the monitor controller 240, the monitor controller 240 may transmit battery data, broadcasted from another monitor node, to the manager node 100.

When it is unable to communicate with the manager node 100 despite using all of the primary channel and the secondary channel, the monitor controller 240 may broadcast battery data, which is to be transmitted to the manager node 100, to another monitor node, and thus, the battery data may be routed to the manager node 100 through the monitor node determined as a relay node. The monitor controller 240 may apply identification information thereof to a random function as a seed, and then, may determine a result value of the random function as a transmission timing of a routing slot. The monitor controller 240 may broadcast the battery data to another monitor node at a time corresponding to the transmission timing in a total section of the routing slot. The transmission timing may overlap between monitor nodes, and thus, the monitor controller 240 may broadcast battery data included in a routing slot at an exclusive time when another monitor node does not use the routing slot. In an embodiment, the monitor node 240 may broadcast the battery data by using CSMA-CA.

When the wireless communication unit 210 receives channel change data including channel change flag activation information, identification information about a preliminary primary channel, and identification information about a preliminary secondary channel from the manager node 100, the monitor controller 240 may activate a channel change flag. Furthermore, at a predetermine time, the monitor controller 240 may change a frequency of a primary channel, set in the wireless communication unit 210, to a frequency of the preliminary primary channel and may change a frequency of a secondary channel, set in the wireless communication unit 210, to a frequency of the preliminary secondary channel.

Figure 14:
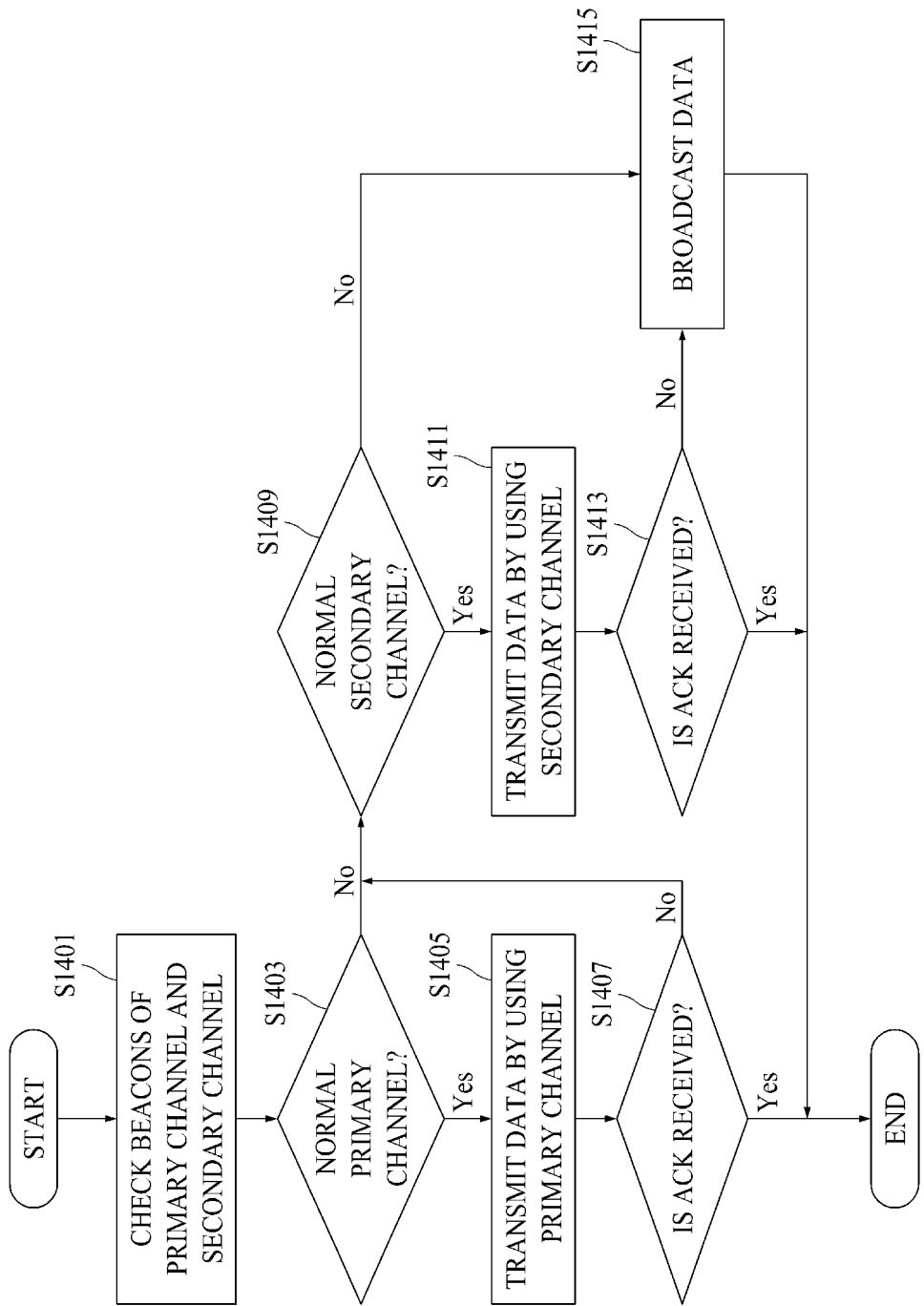
FIG. 14 is a flowchart describing a method of transmitting, by a monitor node, data to a manager node by using one of a primary channel, a secondary channel, and a relay node, according to an embodiment of the present disclosure.

FIG. 14 is a flowchart describing a method of transmitting, by a monitor node, data to a manager node by using one of a primary channel, a secondary channel, and a relay node, according to an embodiment of the present disclosure.

Referring to FIG. 14, in operation S1401, the monitor controller 240 of the monitor node 200 may continuously check a beacon of each of a primary channel and a secondary channel by using the wireless communication unit 210.

Subsequently, when a manager slot including a beacon is received from the wireless communication unit 210, the monitor controller 240 may obtain battery data corresponding to an instruction included in the manager slot. Subsequently, the monitor controller 240 may perform a process of selecting a path for transmitting the battery data. In detail, in operation S1403, the monitor controller 240 may determine whether the primary channel is normal (i.e., whether communication is possible), based on the checked beacon of the primary channel. When a beacon is received through the primary channel formed in the wireless communication unit 210, the monitor controller 240 may determine that the primary channel is normal, and when a beacon is not received for a certain time, the monitor controller 240 may determine that the primary channel is abnormal and thus communication thereof is impossible. Subsequently, when the primary channel is normal in operation S1403 (Yes), the monitor controller 240 may transmit the battery data to the manager node 100 by using the primary channel formed in the wireless communication unit 210 in operation S1405.

Subsequently, in operation S1407, the monitor controller 240 may monitor whether an ACK message is received through the primary channel of the wireless communication unit 210 for a certain time. When the ACK message is received through the primary channel from the manager node 100 for the certain time in operation S1407 (Yes), the monitor controller 240 may determine that the battery data is normally transmitted to the manager node 100 and may end a corresponding cycle.

When it is determined in operation S1403 that a state of the primary channel is abnormal and thus communication of the primary channel is impossible or it is determined in operation S1407 that the ACK message is not received for the certain time, the monitor controller 240 may determine whether a state of the secondary channel is normal, based on a beacon of the secondary channel in operation S1409. When the beacon is received through the secondary channel formed in the wireless communication unit 210, the monitor controller 240 may determine that the secondary channel is normal, and when the beacon is not received for the certain time, the monitor controller 240 may determine that the secondary channel is abnormal and thus communication thereof is impossible.

Subsequently, when the secondary channel is normal and thus communication of the secondary channel is possible in operation S1409 (Yes), the monitor controller 240 may transmit the battery data to the manager node 100 by using the secondary channel formed in the wireless communication unit 210 in operation S1411. When the ACK message is received through the secondary channel from the manager node 100 for the certain time in operation S1413 (Yes), the monitor controller 240 may determine that the battery data is normally transmitted to the manager node 100 and may end a corresponding cycle.

On the other hand, when it is determined in operation S1409 that a state of the secondary channel is abnormal and thus communication of the secondary channel is impossible or it is determined in operation S1413 that the ACK message is not received through the secondary channel for the certain time, the monitor controller 240 may broadcast the battery data to a peripheral monitor node, thereby allowing the battery data to be transmitted through a monitor node which is set as a relay node in operation S1415.

Moreover, the monitor node 200 may be determined as a relay node on the basis of control by the manager node 100. In a state where the monitor node 200 is determined as the relay node, when battery data broadcasted by another monitor node is received by the wireless communication unit 210, the monitor controller 240 may check a priority of the monitor node 200 in the relay node list stored in the storage unit 220. Furthermore, the monitor controller 240 may monitor whether another monitor node, which has a priority higher than the checked priority and is determined as a relay node, routes the battery data, and when the routing of the battery data is completed, the monitor controller 240 may delete the battery data. On the other hand, when routing of the battery data performed by another monitor node having a priority higher than the checked priority fails, the monitor controller 240 may transmit the battery data to the manager node 100 by using the primary channel or the secondary channel.

According to the embodiments of the present disclosure, when a state of a primary channel provided between a manager node and a monitor node is unstable, communication between the manager node and the monitor node may be performed by using a secondary channel or the monitor node set as a relay node, thereby preventing the omission of data and communication disconnection to stably support wireless communication.

Moreover, according to the embodiments of the present disclosure, when communication between a manager node and a specific monitor node is unstable, the manager node may change a primary channel and a secondary channel to stable candidate channels which are secured by searching for channels, thereby maximally maintaining the stability of each channel.

Moreover, according to the embodiments of the present disclosure, a manager node may communicate with a monitor node by using one of three or more communication paths, and thus, may seamlessly communicate with the monitor node even in a short-range wireless communication environment and may accurately and quickly control the monitor node.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

All of the disclosed methods and procedures described in this disclosure can be implemented, at least in part, using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors or other hardware components which, when executing the series of computer instructions, perform or facilitate the performance of all or part of the disclosed methods and procedures.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A manager node comprising:
a first wireless communication unit forming a primary channel based on a first frequency along with each of a plurality of monitor nodes collecting battery data;
a second wireless communication unit forming a secondary channel based on a second frequency along with each of the plurality of monitor nodes; and
a manager controller receiving battery data from each monitor node by using the first wireless communication unit, receiving battery data of a first monitor node by using the second wireless communication unit when communication by the first monitor node through the first wireless communication unit is impossible, and when communication by a second monitor node through the first and second wireless communication units is impossible, communicating with a third monitor node determined as a relay node by using the first wireless communication unit or the second wireless communication unit to receive battery data of the second monitor node from the third monitor node,
wherein the manager controller measures a received signal strength of each monitor node by using the first wireless communication unit or the second wireless communication unit and selects a monitor node, where a level of the received signal strength is within a certain priority, as the relay node from among the plurality of monitor nodes.

2. The manager node of claim 1, wherein the manager controller monitors communication quality of the primary channel, and when the communication quality is degraded as a result of the monitoring, the manager controller broadcasts channel change data, including identification information about a preliminary primary channel and identification information about a preliminary secondary channel, to each monitor node, changes the first frequency of the first wireless communication unit to a frequency of the preliminary primary channel, and changes the second frequency of the second wireless communication unit to a frequency of the preliminary secondary channel.

3. The manager node of claim 2, wherein the manager controller measures an energy level of the first frequency to check an energy detection result value of the primary channel, measures a preamble of a frame occurring in the primary channel to check a frame measurement result value, checks a number of non-receptions representing a number of non-receptions of acknowledge (ACK) from each monitor node, respectively applies weight values to the energy detection result value, the frame measurement result value, and the number of non-receptions, summates a weight-applied energy detection result value, a weight-applied frame measurement result value, and a weight-applied number of non-receptions to calculate a degree of degradation of the primary channel, and when the calculated degree of degradation is outside a predetermined normal range, determines that the communication quality of the primary channel is degraded.

4. The manager node of claim 2, wherein the manager controller searches for channels other than the primary channel to select a channel, where a preamble of a frame is not detected and an energy level of a frequency used thereby is lowest, as the preliminary primary channel from among the channels and to select a channel, where a preamble of a frame is not detected and an energy level of a frequency used thereby is lowest, as the preliminary secondary channel from among channels which are apart from the preliminary primary channel by a certain separation frequency.

* * * * *